Dec. 23, 1952     H. LITTMANN     2,622,473
SLIT LAMP APPARATUS WITH FRONT LENS ATTACHMENT
Filed April 11, 1950
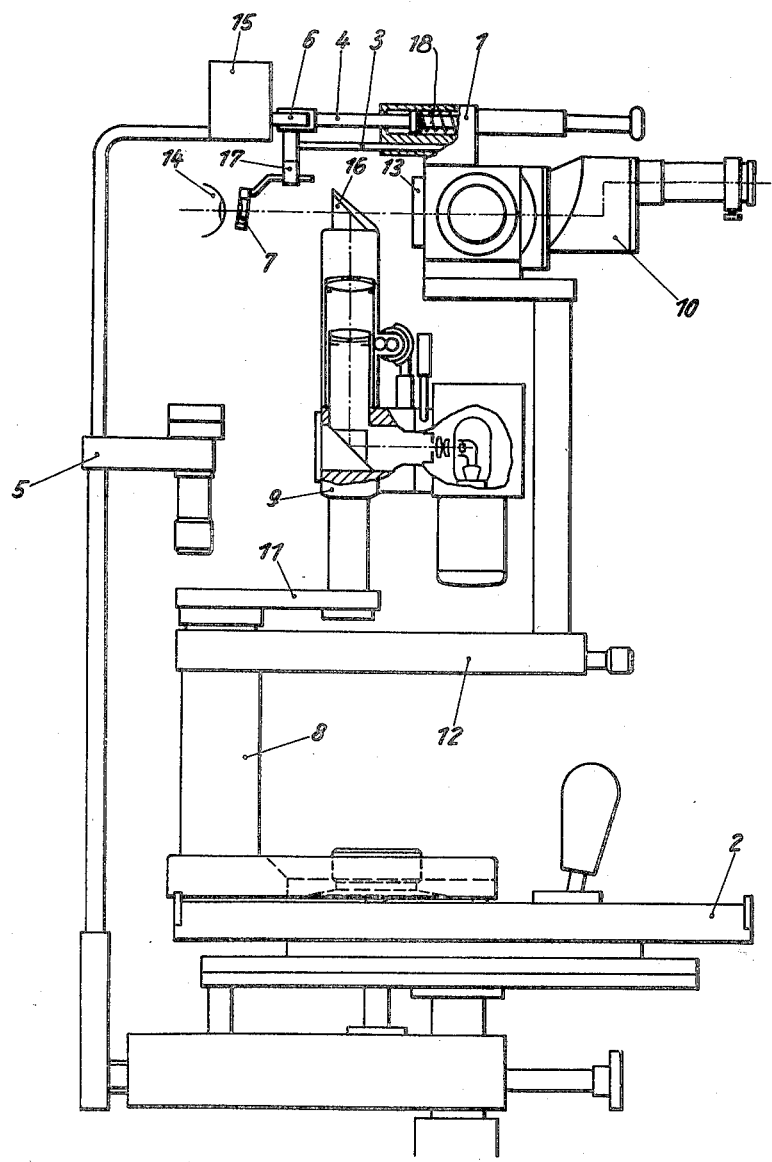
Inventor:
Hans Littmann Patented Dec. 23, 1952

2,622,473

UNITED STATES PATENT OFFICE 2,622,473

SLIT LAMP APPARATUS WITH FRONT LENS ATTACHMENT

Hans Littmann, Heidenheim-on-the-Brenz, Germany, assignor to Zeiss-Opton Optische Werke Oberkochen G. m. b. H., Oberkochen, Wurttemberg, Germany Application April 11, 1950, Serial No. 155,135
In Germany September 3, 1949

2 Claims. (Cl. 88—20)

For examination of the fundus of the eye with aid of the slit lamp, it is necessary, as is known, to compensate the refractive power of the eye lens by means of a front lens attachment, since otherwise the fundus of the eye lies at infinity for the observer and accordingly is not imageable in the observing microscope. It is a customary procedure to insert the front lens attachment in the form of a contact glass placed on the eye of the patient. In other cases the lens has been fastened in a spectacle frame or else on the head rest of the apparatus immediately in front of the eye of the patient. All these arrangements have disadvantages. The contact glass always is uncomfortable for the patient, especially with a diseased eye, whereas front lens attachments which are mounted in spectacle frames or on the headrest make great difficulties in adjustment, especially with the microscope swung out of the near axial region. But in the interest of a good imaging greatest importance must be given to immaculate adjustment precisely with the small lenses of high diopters of about −50 as are required for such front lens attachments.

According to the present invention this is achieved in conformity with the invention by attaching the front lens by means of a carrier arm to the swingable microscope, preferably by setting it on. The carrier arm must be so long that the front lens in customary manner lies as close as possible to the eye. By being attached to the microscope the lens is thus always carried along in displacement and swinging of the apparatus and remains in all positions of the microscope always correctly adjusted to the observation path of rays.

To avoid unintentional pushing of the lens into the eye of the patient or moving it too far from the eye while changing the distance of the microscope from the eye, in an especially preferred form of execution of the invention a stop collar is provided on the head rest, the arm carrying the front lens being allowed to resiliently support against said stop collar, so that after once establishing the distance of the lens from the eye, this distance is continually maintained during displacement and swinging of the microscope. Through this arrangement examination of the fundus of the eye by means of a slit lamp apparatus is extraordinarily facilitated for the physician, since during the examination he need give no consideration to adjustment of the front lens attachment in displacement and swinging of the microscope.

Further details of the invention ensue from the accompanying drawing and the following description.

The slit lamp apparatus shown in the drawing as an example of construction, stands upon a table whose top 2 is adjustable in height, laterally, and in depth. A head rest 5 is also attached to the table, without however participating in the fine adjustments of the table top. The slit lamp apparatus possesses a pillar 8 about which a slit lamp 9 and a microscope 10 with their carrier arms 11 respectively 12 are swingable. Both instruments, slit lamp and microscope, can be constructed in the customary manner. As a microscope a stereomicroscope is suitably employed. The slit lamp with its ray exit prism 16 and the microscope with its objective 13 are directed upon the patient's eye 14, sketchily represented. The axis of the pillar of rotation appropriately passes through the pupil or the spot to be observed in the interior of the eye 14.

In order to observe with the microscope also interior or fundus of the parts of the eye, the action of the eye lens must be compensated. For this purpose is provided, as close as possible in front of the eye, a negative front lens attachment 7 of high diopter number, e. g. −50 diopters. This lens is fastened to the microscope 10 by means of a set-on carrier body 1. In the carrier body two displaceable guiderods 3 and 4 are bedded. The lens 7 is fastened at the front ends of the rods upon a holder 17. Besides, a guiding roller 6 is provided, rotatable about a vertical axis, with which the entire holding device supports itself against a stop collar 15, which itself is fastened to the head rest 5. For this purpose a spring 18 is provided in the carrier body 1 which presses the rod 4 against the stop collar 15. The stop collar 15 is developed in the form of a cylinder whose axis likewise runs approximately through the pupil of the eye. For precise adjustment of the distance of the lens 7 from the eye the former can also be supplementarily displaced in a guide of holder 17.

Through the described arrangement is achieved that the front lens attachment in maintaining its distance from the eye always remains properly adjusted in the path of rays of the microscope, and indeed independently of the direction of viewing of the microscope and of its distance from the eye 14.

The invention possesses especial significance for slit lamp apparatus, however, under circumstances it can also be useful in connection with other ophthalmological instruments, when it is a matter of arranging a front lens attachment precisely adjusted in the path of rays of an examining instrument.

I claim:

1. In an eye examining slit lamp apparatus having a base, a head rest on said base, a pivotally mounted slit lamp illuminating device and an observation microscope device adapted for observing the cornea of the patient's eye, both devices rotatable about a common axis traversing the head rest at the locus at which the cornea of the eye to be observed is to be located, the combination with said observation microscope device of a lens attachment comprising a lens of about minus 50 diopters for compensating the refractive power of the patient's eye lens for fundus observation purposes, and comprising a carrier arm having means for detachably mounting said lens to it, said arm being supported by said microscope device and thus being swingable together with said microscope device about said common axis, said lens being disposed in the path of the microscope observation rays and cooperating with said microscope upon all directions of observation of the fundus of the eye to be examined.

2. In an eye examining slit lamp apparatus according to claim 1 a stop collar attached to the upper end of said head rest and forming part of a cylinder bearing surface with its axis coinciding with said common axis, means comprising guiding roller means attached to the front end of said arm adjacent said stop collar, and a spring element between said lens carrier arm support and said arm for allowing resilient supporting of said arm against said stop collar in a fixed distance from said eye to be examined upon all directions of observation of the fundus of the eye to be examined.

HANS LITTMANN.

REFERENCES CITED

The following references are of record in the file of this patent:

UNITED STATES PATENTS

| Number | Name | Date |
| --- | --- | --- |
| 756,958 | Harraes | Apr. 12, 1904 |

FOREIGN PATENTS

| Number | Country | Date |
| --- | --- | --- |
| 620,541 | Germany | Oct. 23, 1935 |
| 522,148 | Great Britain | June 11, 1940 |

OTHER REFERENCES

Lemoine et al., article in Bulletin Soc. Francaise D'Ophthalmologie, vol. XXXVI, 1923, pages 366–372. (Copy in Army Medical Library)